US007403270B2

(12) United States Patent
Huang et al.

(10) Patent No.: US 7,403,270 B2
(45) Date of Patent: Jul. 22, 2008

(54) METHOD FOR WHOLE FIELD THIN FILM STRESS EVALUATION

(75) Inventors: Chi Hung Huang, Hsin-Chu (TW); Hsien-I You, Hsin-Chu (TW); Mao-Yuan Shih, Hsin-Chu (TW); Chien-Jen Chen, Hsin-Chu (TW)

(73) Assignee: Instrument Technology Research Center, National Applied Laboratories, Hsin-Chu (TW)

( * ) Notice: Subject to any disclaimer, the term of this patent is extended or adjusted under 35 U.S.C. 154(b) by 246 days.

(21) Appl. No.: 11/430,449

(22) Filed: May 9, 2006

(65) Prior Publication Data

US 2007/0017296 A1   Jan. 25, 2007

(30) Foreign Application Priority Data

May 10, 2005   (TW) ............................... 94115145 A

(51) Int. Cl.
*G01L 1/24*   (2006.01)
*G01B 11/02*   (2006.01)

(52) U.S. Cl. .................... 356/35.5; 356/512; 73/800
(58) Field of Classification Search ............... 356/35.5, 356/512–514, 489, 495; 73/800, 802
See application file for complete search history.

(56) References Cited

U.S. PATENT DOCUMENTS

| 6,466,308 | B1 * | 10/2002 | Jaing et al. ................. 356/35.5 |
| 7,261,985 | B2 * | 8/2007 | Smith et al. .................... 430/30 |
| 2005/0202328 | A1 * | 9/2005 | Smith et al. .................... 430/30 |

* cited by examiner

*Primary Examiner*—Patrick J Connolly
(74) *Attorney, Agent, or Firm*—Volpe and Koenig PC

(57) ABSTRACT

A novel method for whole field thin film stress evaluation is provided. Through the provided method, the whole filed thin film stress distribution for an optical thin film would be developed with a commercial interferometer, so that a whole field evaluation for the crack or peel-off of thin film is hence achievable.

13 Claims, 6 Drawing Sheets
(3 of 6 Drawing Sheet(s) Filed in Color)

METHOD FOR WHOLE FIELD THIN FILM STRESS EVALUATION

FIELD OF THE INVENTION

The present invention relates to a method for evaluating the stress in a thin film, and more particularly to a method for evaluating the whole field stress in a thin film.

BACKGROUND OF THE INVENTION

Thin film stress is regarded as a quite important factor in the thin film deposition. The thin film would be possibly peeled off from the substrate, crack or wrinkle may occur while the stress existing therein is relatively large. In addition, damaged optical film may introduce unexpected scattering beams into optical system, which may lead to the production of ghost image. The optical system may thus suffer performance regression and even fail in operation. Moreover, the performance of the deposited thin film in an electro-optics device under a critical operating condition shall be also taken into consider. Generally, optical elements of a relatively high power are always adopted in a typical liquid crystal projector for achieving the high illumination, which brings the optical engine to be operated under a high temperature, so that the optical thin film or the optical coating would be easily peeled off or damaged due to the high temperature thereof. In this case, the liquid crystal projector may be disadvantageous in conducting a reduced illumination and a non-uniform lightness, and the ghost image produced owing to the damaged optical thin film therein also decreases the performance thereof. Therefore, it becomes a critical issue in this field to evaluate the ability in estimating the stress introduced by deposited thin film thereof.

Thin film stress is introduced during the coating process owing to the difference between the respective phase states of the substrate and the deposited thin film thereon. In some coating or deposition processes, such as the thermal oxidation deposition, sputtering, the evaporation and the chemical vapor deposition (CVD), it needs to heat the substrate as well as the thin film deposited thereon, which leads to the residual stress existing in the thin film.

Typically, the thin film stress is evaluated by means of non-destructive testing including the mechanical method, the interference method and X-ray diffraction method. The X-ray diffraction method is performed for a crystalline film, where the average stress of a thin film is derived from the comparison between the lattice distance of the fabricated film and the theoretical lattice constant of an undeformed lattice. Such a method, however, is not suitable for an amorphous film. The mechanical method as well as the interference method were based on the theory developed by Stoney in 1909, where the measurement of curvature radius of a deformed foil substrate in combination of the relationship between the film stress and the curvature radius of a substrate-film hybrid structure are adopted for the basis of stress measurement for the electroplated film, so as to evaluate the stress existing therein. Such methods, as well as the modification thereof, are typically adopted for the thin film stress evaluation, in particular for the stress evaluation for an amorphous film, in both the academia and the industrial circles at present days.

In order to evaluate the thin film stress precisely, it needs to increase the precision of measurement for the respective curvature radius of the substrate and the hybrid structure as possible. For this purpose, it always adopts the optical interference method or the optical leverage technique with an image processing system or sensing elements for the curvature radius measurement.

Take for examples, the optical leverage technique in combination of the image processing is developed for improving the precision of measurement for the deformation at the terminal of a cantilever structure. In 2000, Twyman-Green interferometer combining with the phase shift concept is developed for increasing the precision of measurement for the surface topography and for obtaining a whole field deformation as well. Such a method, however, still adopts an average curvature of the substrate-film hybrid structure for evaluating the average stress existing in the thin film. Moreover, the shadow moiré method combing with the three-step phase shifting method is further developed for measuring the deformation of a wafer thin film, where the average curvature of the substrate-film hybrid structure is also adopted for evaluating the average stress existing in the thin film, so as to increase the precision of measurement for the curvature radius.

Nevertheless, the mentioned methods adopt the phase information regarding the whole field only for precisely evaluating the average stress of the film, which still fail to provide a method for a whole field stress evaluation for the thin film. Furthermore, the region where the film is peeled off or cracks is initialized always a region of an local extreme high stress, rather than the region of an average stress, and thus the mentioned methods are not suitable for the crack or peel-off location prediction and/or evaluation for thin film.

For overcoming the mentioned drawbacks of the prior art, a novel method for whole field thin film stress evaluation is provided in the present invention, whereby the whole filed thin film stress distribution for an optical thin film would be developed with a commercial interferometer, so that a whole field evaluation for the crack or peel-off of thin film is hence achievable.

SUMMARY OF THE INVENTION

It is a first aspect of the present invention to provide a method for evaluating a whole field stress in a thin film. The provided method includes the steps of (a) preparing a substrate; (b) measuring associated wavefront of the substrate by an interferometer with a laser having a wavelength of λ, so as to obtain a first wavefront phase; (c) depositing an optical thin film on the substrate as a specimen; (d) measuring associated wavefront for the specimen, so as to obtain a second wavefront phase; (e) determining a phase difference between the first wavefront phase and the second wavefront phase by means of an image subtraction; (f) fitting the phase difference with Zernike polynomials; (g) retaining the coefficients of the specific terms of the Zernike polynomials according to the fitting result; and (h) obtaining the whole field stress according to the coefficients of the specific terms.

In accordance with the first aspect of the present invention, the specific terms are corresponding to the deformation introduced by the whole field thin film stress.

Preferably, the substrate is a BK7 optical substrate.

Preferably, the flatness of the substrate is less than λ.

Preferably, in the steps (b) and (d), the wavefront is measured by a Fizeau interferometer with a standard planar lens having a precision less than λ/10.

Preferably, in the step (c), the optical thin film is deposited on the substrate by a physical coating process.

Preferably, the physical coating process is one selected from a group consisting of an evaporation, a sputtering and a physical vapor deposition.

Preferably, the optical thin film is made of silica oxide.

Preferably, in the step (g), the specific term is determined by a formula of $\nabla^4 Z(\rho,\theta)=0$, wherein $Z(\rho,\theta)$ represents the Zernike polynomials.

It is a second aspect of the present invention to provide a method for evaluating a whole field stress in a thin film. In accordance with the second aspect, the provided method includes the steps of (a) preparing a substrate; (b) measuring associated wavefront for the substrate with a laser having a wavelength of λ, so as to obtain a first wavefront phase; (c) depositing an optical thin film on the substrate as a specimen; (d) measuring associated wavefront for the specimen, so as to obtain a second wavefront phase; (e) determining the first wavefront phase and the second wavefront phase by means of fitting the phases with Zernike polynomials, so as to obtain the fitting results for respective surface topography of the substrate and the specimen; (f) determining a phase difference between the first wavefront phase and the second wavefront phase by means of numerical subtraction of the coefficients of the special terms of the Zernike polynomials; (g) retaining the coefficients of the specific terms of the Zernike polynomials according to the fitting result; and (h) obtaining the whole field stress according to the coefficients of the specific terms.

Preferably, the substrate is a BK7 optical substrate.

Preferably, in the steps (b) and (d), the wavefront is measured by means of two-beam interferometer.

Preferably, the optical thin film is made of silica oxide.

Preferably, in the step (g), the specific term is determined by a formula of $\nabla^4 Z(\rho,\theta)=0$, wherein $Z(\rho,\theta)$ represents the Zernike polynomials.

The foregoing and other features and advantages of the present invention will be more clearly understood through the following descriptions with reference to the drawings, wherein:

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIGS. 4(a), 4(b), 5(a), 5(b), 6(a) and 6(b) illustrate the contour diagrams in color.

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

First, the theoretical basis for the method according to the present invention is provided.

The thin film stress that is extremely produced while a thin film is deposited on a substrate typically results from the deformation limitation occurring at the interface of the substrate and the thin film, where the magnitude thereof depends on the combination of the substrate-film structure as well as the method adopted for deposition. There would be a lot of voids or cracks produced at the interface of the thin film and the substrate, and even the thin film would be easily peeled off from the substrate, if the thin film stress is relatively large. Generally speaking, the thin film stress, that makes the substrate surface to deform as a concave, is defined as a tensile stress, while the stress resulting in a raised substrate surface is termed as a compressive stress. In more details, it is the tensile stress that leads to the film crack and peeling-off.

Figure 1:
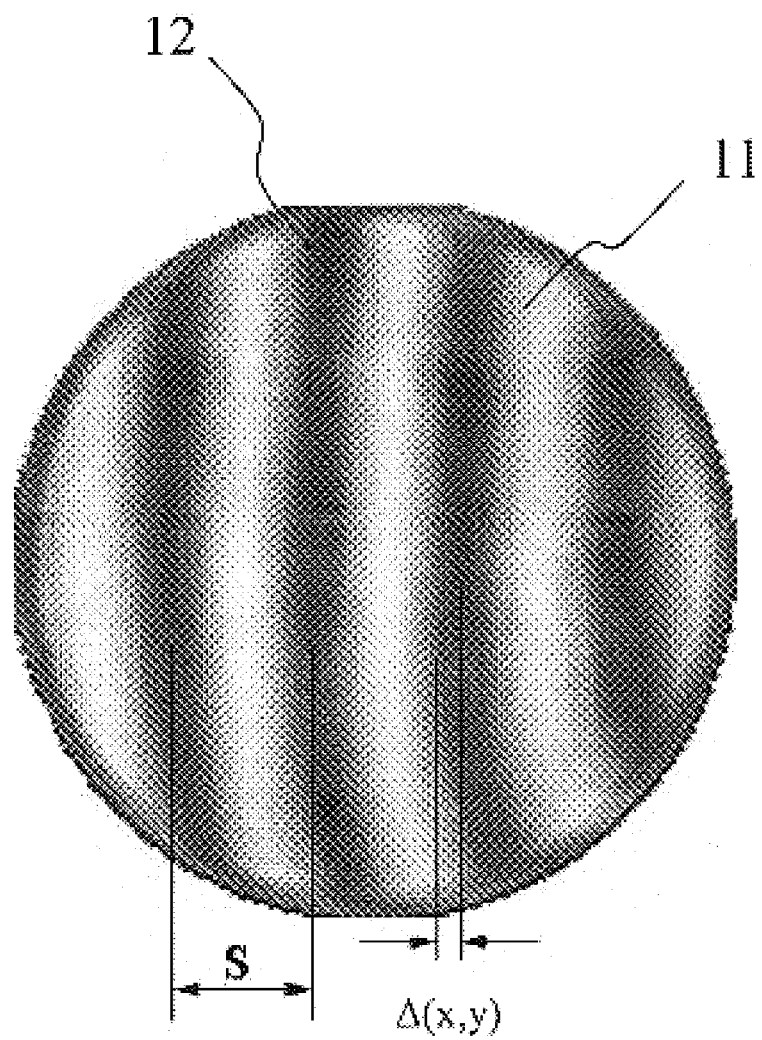
FIG. 1 is a diagram showing an interference pattern obtained from a Fizeau interferometer.

In the present invention, a commercial Fizeau interferometer is adopted for measuring the optical wavefront. Please refer to FIG. 1, which is a diagram showing the interference pattern obtained from the Fizeau interferometer. The interference pattern, including the bright fringe 11 and the dark fringe 12, is typically regarded as a function of the distance between the reference plate of the interferometer and the specimen, whereby the surface flatness of the specimen would be obtained if the surface of the reference plate is an optical flat. The surface deformation in height between the specimen surface and the reference plate, $\epsilon_{surface}$, is determined as equation (1):

$$\varepsilon_{surface} = \frac{\lambda \Delta(x, y)}{2S}, \quad (1)$$

where S represents the interspace of the interference pattern, i.e. the interspace of two adjacent bright fringes or of two adjacent dark fringes, λ is the wavelength of laser applied in the interferometer, and $\Delta(x, y)$ is the distance of a desired fringe departing the original parallel fringes, which is a function of location of the desired fringe.

The Zernike polynomials $Z(\rho,\theta)$ defining in polar coordinates is typically used for fitting the wavefront for an optical surface, which is defined as equation (2):

$$Z(\rho, \theta) = \Re \left\{ \sum_{s=0}^{n-m/2} \frac{(-1)^s (n-s)! \rho^{n-2s}}{s!(n+m/2-s)!(n-m/2-s)!} \cdot e^{\pm im\theta} \right\}, \quad (2)$$

where $\Re$ represents a real number, n>m and an integer that is closest to the value of (n±m)/2 is adopted therefor.

In the present invention, the Fizeau interferometer is adopted for measuring the wavefront for a desired surface, where the interspace of the interference pattern S is exactly the tilt with respect to the a reference plate. Accordingly, the wavefront obtained from the mentioned measurement typically contains a tilt term therein. The equation (2) is adopted for fitting the respective wavefront of an uncoated and a coated substrate while the film stress is to be evaluated by determining the respective surface topography thereof. Based on the measurement principle for the Fizeau interferometer, the measurement result obtained therefrom is a height between the specimen surface and the reference plate, and thus the interference pattern for the wavefront of an uncoated substrate is exactly regarded as the surface topography of an optical thin film. When the substrate surface is coated with a thin film, the optical property thereof would be varied and a stress would be introduced thereto, so that a deformation may be generated owing to the introduced stress. Accordingly, the interference pattern for a coated substrate is exactly regarded as the combining effect of the optical property and the introduced stress that is caused by the coated film thereon.

Figure 2:
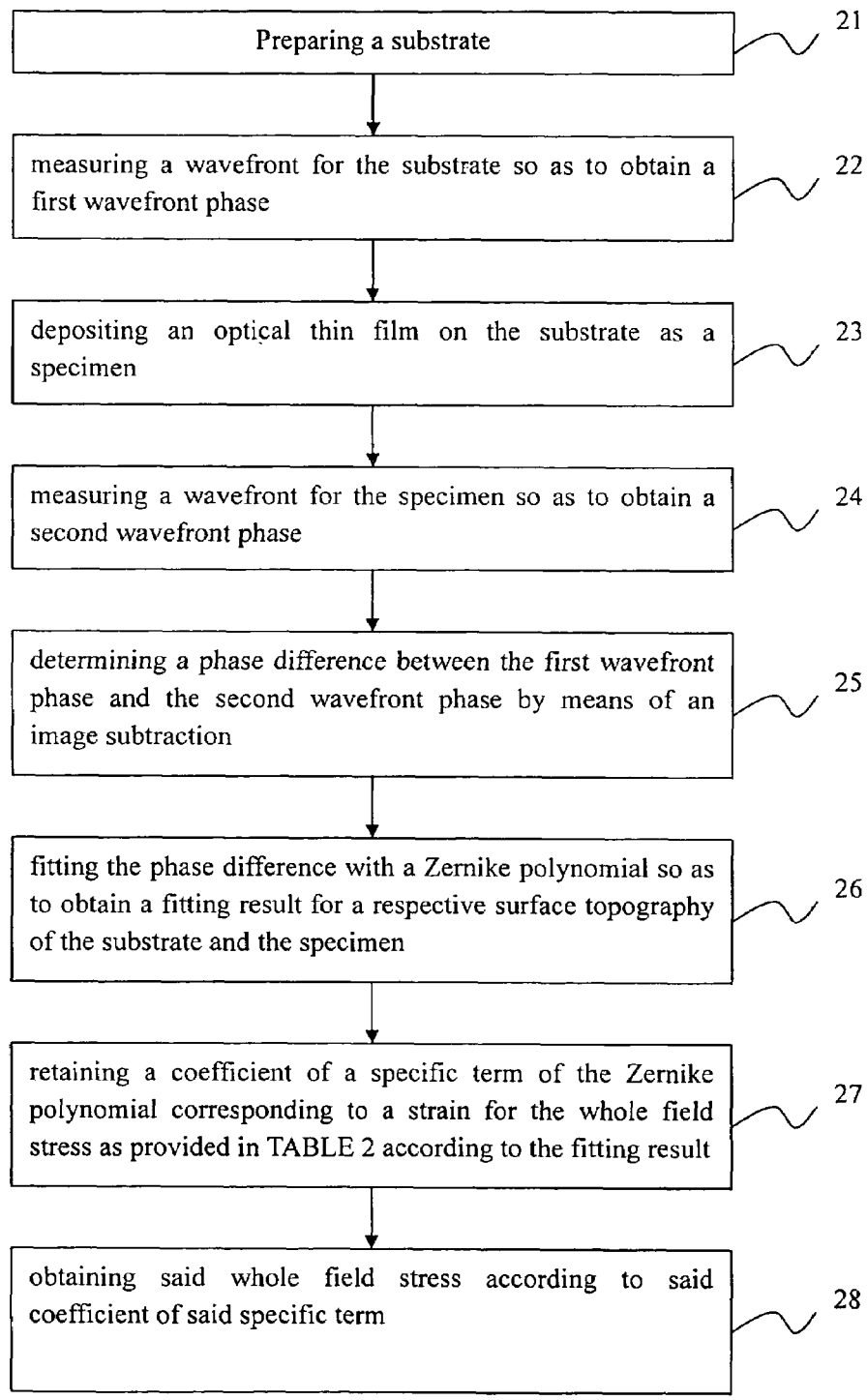
FIG. 2 is a flowchart illustrating the steps of the method according to a preferred embodiment of the present invention.

Please refer to FIG. 2, which is a flowchart illustrating the steps of the method according to a preferred embodiment of the present invention. As shown in the step 21, a substrate is provided. In this embodiment, the substrate is preferably a round-shaped BK7 optical substrate, having a diameter of 27.4 mm and a thickness of 2±0.1 mm, whose faces are both ground and polished to obtain a surface flatness less than $\lambda$, the wavelength of laser applied for measuring the wavefront. Moreover, the substrate is marked with a reference on the edge thereof, so as to ensure the direction for wavefront measurement therefor before and after the film deposition. The material parameters of such substrate are tabulated in TABLE 1.

Second, the substrate is performed with the wavefront measurement, so as to obtain a first pattern regarding the phase of the wavefront, as shown in the step 22. In this embodiment, the wavefront is measured by means of two-beam interference, and the wavelength of the laser applied therefor, $\lambda$, is preferably 632.8 nm. Moreover, the commercial GPI XP$_{HR}$ 4"/12" Fizeau interferometer with a standard planar lens as a reference plate having a precision less than $\lambda/10$.

Afterward, the specimen is prepared, as shown in the step 23. The specimen is formed by an anti-reflection optical film of SiO$_2$ single layer which is deposited on the provided substrate via evaporation. In this embodiment, the SiO$_2$ single layer is deposited on the substrate by an electron gun assist evaporation system of under the respective substrate temperatures of 50° C., 100° C., 150° C., 200° C. and 300° C. In addition to the evaporation, further deposition schemes including sputtering or physical vapor deposition (PVD) are also adoptable for preparing the specimen. Furthermore, the thickness of the deposited film could be monitored by a thickness monitor, so as to be controlled as $\lambda/4$ where $\lambda$ is 632.8 nm. The material parameters of the SiO$_2$ film are also tabulated in TABLE 1.

TABLE 1

| Mechanical Property | BK-7 substrate | SiO$_2$ film |
|---|---|---|
| Density (g/cm$^3$) | 2.51 | 2.328 |
| Young's Modulus (GPa) | 81 | 290 |
| Poisson Ratio | 0.208 | 0.25~0.3 |
| Thermal Expansion Coefficient (°C$^{-1}$) | 7.1 × 10$^{-6}$ | 0.24 × 10$^{-6}$ |

The wavefront of the specimen is also measured by the commercial GPI XP$_{HR}$ 4"/12" Fizeau interferometer with a standard planar lens as a reference plate having a precision less than $\lambda/10$, so as to obtain a second pattern regarding the phase of the wavefront for the specimen, as shown in the step 24.

Then, the phase difference between the first wavefront and the second wavefront is determined by means of image subtraction, and the phase difference is fit with the Zernike polynomials, i.e. equation (2), so as to obtain a fitting result for the surface topography difference between the substrate and the specimen, as shown in the steps 25 and 26, respectively.

Finally, a set of specific terms of the Zernike polynomials, relating to the stress, is obtained based on the fitting result for the surface topography. Such polynomials consider the whole field displacement of the optical film, and the whole field stress existing in the thin film would be obtained therefrom in combination with the displacement-stress relationship, as shown in the steps 27 and 28, respectively.

In the present invention, the first 36 terms of the Zernike polynomials are adopted for fitting the topographies of the substrate and the specimen. When having the same value of |m|, the Zernike polynomials would exhibit an orthogonality in the unit circle therefor. Even though such orthogonality fails to completely satisfy the requirement to span a functional space of a displacement field, a set of specific terms of the Zernike polynomials still satisfy to span low spatial frequency displacement function space. Accordingly, the mentioned Zernike polynomial is regarded as being composed of the function regarding the optical characteristics, $O(\rho,\theta)$, and a further function regarding the mechanical displacement, $M(\rho,\theta)$. In other words, the elements of the set of the Zernike polynomial is composed of the respective subsets of functions $O(\rho,\theta)$ and $M(\rho,\theta)$. When the surface to be fitted is exactly the surface of an optical film, $M(\rho,\theta)$ would be regarded as the function relating to the out of plane displacement, and $M(\rho,\theta)$ would satisfy the biharmonic function as equation (3) since there is no applied force existing on the specimen when analyzing the film stress.

$$\nabla^4 M(\rho,\theta)=0 \qquad (3)$$

Regarding a polar coordinate system, equation (3) could be further represented as:

$$\left(\frac{\partial^2}{\partial^2 \rho} + \frac{1}{\rho}\frac{\partial}{\partial \rho} + \frac{1}{\rho^2}\frac{\partial^2}{\partial \theta^2}\right)\left(\frac{\partial^2}{\partial^2 \rho} + \frac{1}{\rho}\frac{\partial}{\partial \rho} + \frac{1}{\rho^2}\frac{\partial^2}{\partial \theta^2}\right) M(\rho,\theta) = 0 \qquad (4)$$

In the first 36 terms of the Zernike polynomial derived from the mentioned steps, the terms of which satisfying biharmonic function and which corresponding to the stress and strain are tabulated in TABLE 2, which is essential for performing the step 27.

TABLE 2

| n | m | Term | Zernike Polynomials | biharmonic function |
|---|---|---|---|---|
| 0 | 0 | 0 | 1 | Yes |
| 1 | +1 | 1 | $\rho \cos \theta$ | Yes |
|   | −1 | 2 | $\rho \sin \theta$ | Yes |
|   | 0 | 3 | $2\rho^2 - 1$ | Yes |
| 2 | +2 | 4 | $\rho^2 \cos 2\theta$ | Yes |
|   | −2 | 5 | $\rho^2 \sin 2\theta$ | Yes |
|   | +1 | 6 | $(3\rho^2 - 2)\rho \cos \theta$ | Yes |
|   | −1 | 7 | $(3\rho^2 - 2)\rho \sin \theta$ | Yes |
|   | 0 | 8 | $6\rho^4 - 6\rho^2 + 1$ | No |
| 3 | +3 | 9 | $\rho^3 \cos 3\theta$ | Yes |
|   | −3 | 10 | $\rho^3 \sin 3\theta$ | Yes |
|   | +2 | 11 | $(4\rho^2 - 3)\rho^2 \cos 2\theta$ | Yes |
|   | −2 | 12 | $(4\rho^2 - 3)\rho^2 \sin 2\theta$ | Yes |
|   | +1 | 13 | $(10\rho^4 - 12\rho^2 + 3)\rho \cos \theta$ | No |
|   | −1 | 14 | $(10\rho^4 - 12\rho^2 + 3)\rho \sin \theta$ | No |
|   | 0 | 15 | $20\rho^6 - 30\rho^4 + 12\rho^2 - 1$ | No |
| 4 | +4 | 16 | $\rho^4 \cos 4\theta$ | Yes |
|   | −4 | 17 | $\rho^4 \sin 4\theta$ | Yes |
|   | +3 | 18 | $(5\rho^2 - 4)\rho^3 \cos 3\theta$ | Yes |

TABLE 2-continued

| n | m | Term | Zernike Polynomials | biharmonic function |
|---|---|---|---|---|
|  | −3 | 19 | $(5\rho^2 - 4)\rho^3 \sin 3\theta$ | Yes |
|  | +2 | 20 | $(15\rho^4 - 20\rho^2 + 6)\rho^2 \cos 2\theta$ | No |
|  | −2 | 21 | $(15\rho^4 - 20\rho^2 + 6)\rho^2 \sin 2\theta$ | No |
|  | +1 | 22 | $(35\rho^6 - 60\rho^4 + 30\rho^2 - 4)\rho \cos \theta$ | No |
|  | −1 | 23 | $(35\rho^6 - 60\rho^4 + 30\rho^2 - 4)\rho \sin \theta$ | No |
|  | 0 | 24 | $70\rho^8 - 140\rho^6 + 90\rho^4 - 20\rho^2 + 1$ | No |

Figure 3:
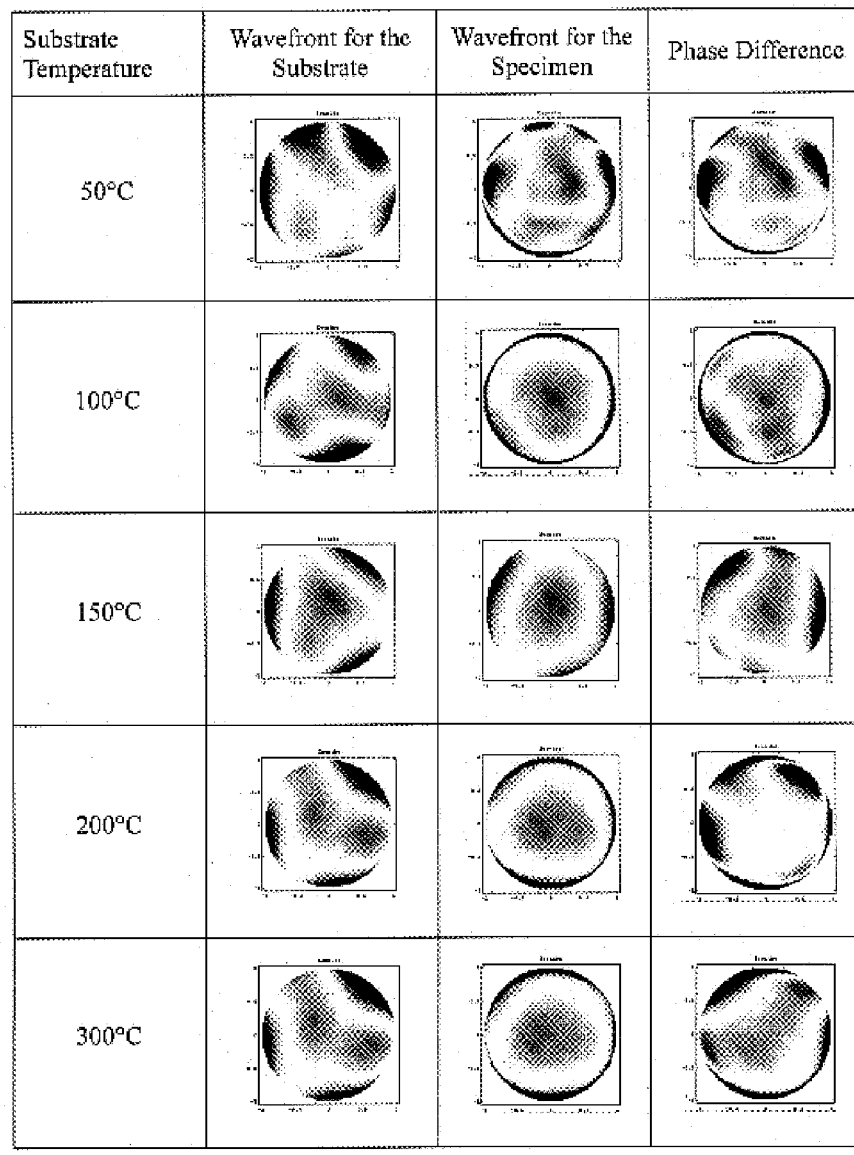
FIG. 3 is a diagram showing the respective patterns for the wavefront phases of the BK-7 substrate and the specimen as well as the pattern for the phase difference therebetween according to a preferred embodiment of the present invention.

Please refer to FIG. 3, which shows the respective patterns for the wavefront phases of the BK-7 substrate and the specimen as well as the pattern for the phase difference therebetween according to a preferred embodiment of the present invention. In this embodiment, the respective specimen is prepared under a substrate temperature of 50° C., 100° C., 150° C., 200° C. and 300° C.

It is found from the respective phase patterns of the substrate and the specimen that the substrate having a film deposited thereon, i.e. the specimen, would be deformed as a bell-like shape, except the 50° C.-specimen. Such deformation is irrelevant to the surface precision of the substrate, and if one directly adopts the conventional method in this art to calculate the average stress of the film with an average curvature radius, the average stress derived therefrom would be also irrelevant to the thickness of the film. Nevertheless, such a result apparently fails in the fact that the film stress depends on the thickness of film. Moreover, it is much difficult to evaluate the film damage or crack and to predict and analyze where the film damage or crack occurs only based on the variation of the curvature radius of the specimen.

Figure 4A:
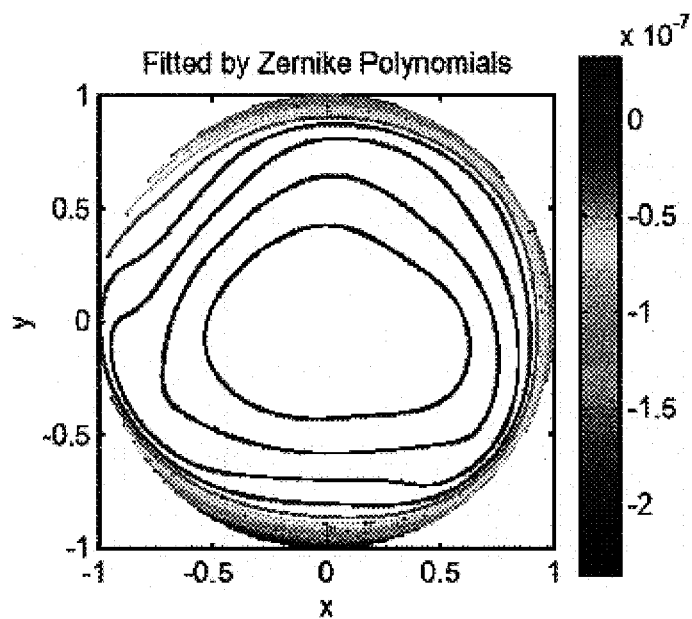
FIGS. 4(a) and 4(b) are the respective contour maps showing the surface topography of the specimen that is fitted with the Zernike polynomials and the surface topography of the specimen that is fitted with the Zernike polynomials satisfying the biharmonic function.
Figure 4B:
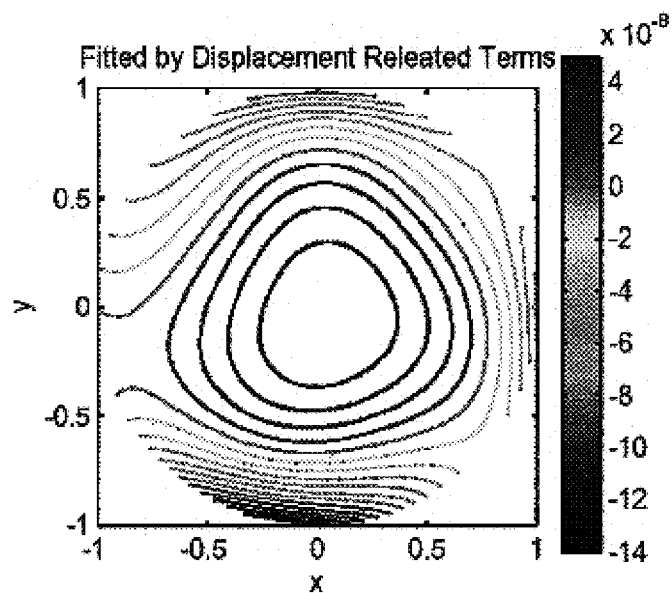

In the present invention, taking the specimen prepared under a substrate temperature of 300° C. for the example, the fitting result of the surface topography thereof obtained by the present method is illustrated. Please refer to FIGS. 4(a) and 4(b), which are the respective contour maps showing the surface topography of the specimen that is fitted with the Zernike polynomials and the surface topography of the specimen that is fitted with the Zernike polynomials satisfying the biharmonic function according to the present invention. It is apparent that both the mentioned surface topographies are typically a bell-like shape, even the respective maximal heights, as well as the boundaries of the surface topographies are different.

Figure 5A:
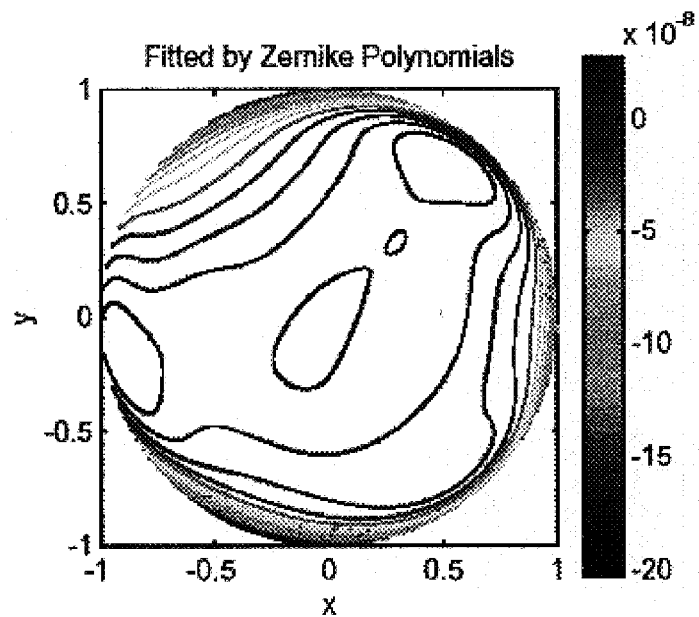
FIGS. 5(a) and 5(b) are the respective diagrams showing the phase difference contour between a substrate and a specimen which is fitted with the Zernike polynomials and fitted with the Zernike polynomials satisfying the biharmonic function.
Figure 5B:
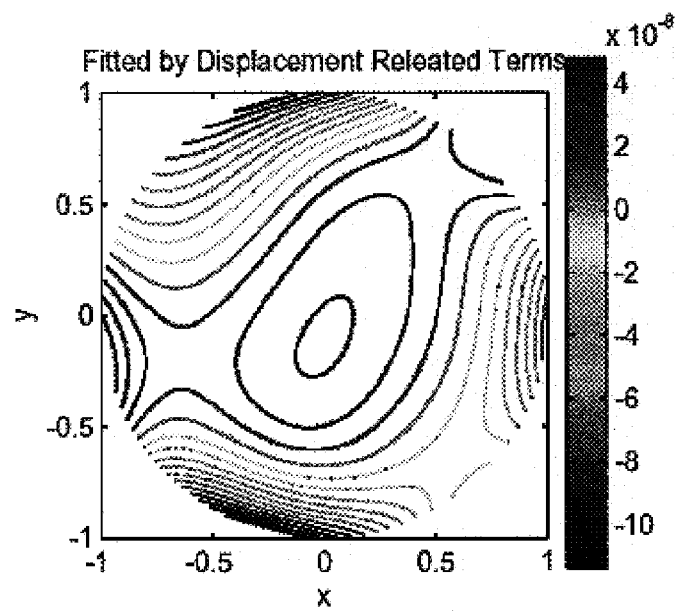

In comparison with FIGS. 5(a) and 5(b) are the respective diagrams showing the phase difference contour between a substrate and a specimen which is fitted with the Zernike polynomials and fitted with the Zernike polynomials satisfying the biharmonic function according to a preferred embodiment of the present invention, there exists a non-continuous distribution in the central region of FIG. 5(a), while in FIG. 5(b), there is no such non-continuous distribution existing therein. As shown in FIG. 5(b), the central region rises high while the periphery region goes down, and the maximal extreme value of the surface topography thereof is larger than that of FIG. 5(a).

Owing to the different structures of the respective substrate and the specimen, the mentioned fitting results shall not be directly regarded as the deformation generated while the specimen is applied with a loading. Nevertheless, since the thickness of the film ($\lambda/4$, approximately 150 nm) deposited on the substrate is extremely smaller than that of the substrate (approximately 2 mm), thin film stress work as a surface traction force would be applied on the substrate in the deposition process if the thickness of the film deposited thereon is negligible, whereby the distribution as shown in FIG. 5(b) could be regarded as the deformation generated after the substrate is applied with the film stress, and the interface stress could be evaluated according thereto.

Figure 6A:
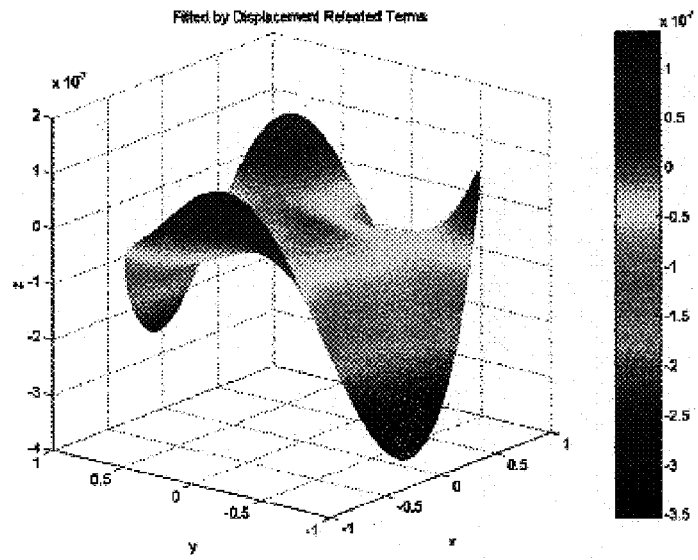
FIGS. 6(a) and 6(b) are diagrams respectively showing the whole field strains $\epsilon_{rz}$ and $\epsilon_{\theta z}$ derived from the fitting result as shown in FIG. 5(b).
Figure 6B:
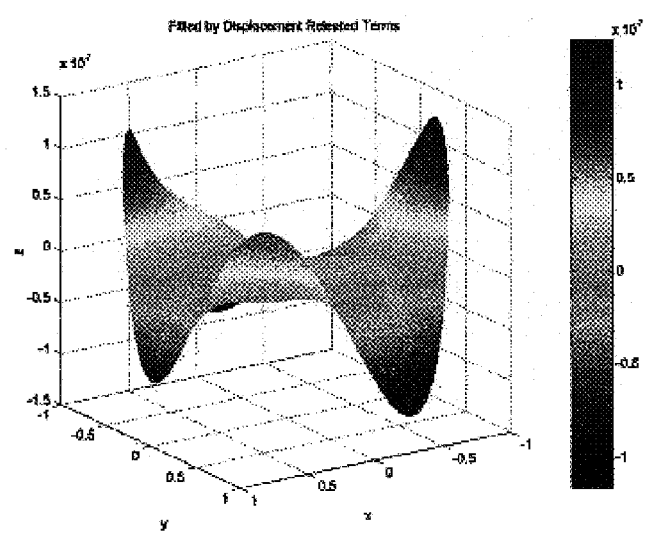

Please refer to FIGS. 6(a) and 6(b), which are diagrams respectively showing the strains $\epsilon_{rz}$ and $\epsilon_{\theta z}$ derived from the fitting result as shown in FIG. 5(b). It is apparent that the respective maximal tensile strain of the strains $\epsilon_{rz}$ and $\epsilon_{\theta z}$ are almost equivalent to each other, but the respective positions thereof are completely different. It is worthy to be mentioned that the maximal strain occurs at the periphery region of the optical film rather than the central region thereof. Since the tensile stress extremely easily causes the film crack or makes the film peel off from the substrate, it would be hence achievable to precisely evaluate the position where the optical film is peeling off from the substrate with the strain distribution derived from the method according to the present invention. Furthermore, it is also found that the maximal compressive strain also occurs at the periphery region of the optical film, which may affect the imaging or filtering quality of the optical system, although it would not result in the film crack.

Based on the mentioned, the present invention adopts the Zernike polynomials to fit and simulate the mechanical deformation of the substrate as well as the optical film that is generated by the film stress caused by the film deposition, whereby the stress and the strain distribution therefor could be obtained. In more specifics, the fitting result obtained from the present invention is applicable as a predication tools for film stress evaluation and crack analysis. Furthermore, the method of the present invention is developed for evaluating the whole field thin film stress, where the variation of the surface topography of the substrate after being coated with a film is determined by dividing the Zernike polynomials into an optics relating functions $O(\rho,\theta)$ and a displacement relating functions $M(\rho,\theta)$ as well as a linear combination thereof. Regarding the industrial application, since the thickness of the film deposited on the substrate is extremely smaller than that of the substrate, the surface topography that is fitted with the displacement relating functions $M(\rho,\theta)$ according to the present invention is adoptable as the deformation generated while the substrate is applied with a surface stress of the film deposited thereon. Therefore, the present invention is advantageous in being applicable for the crack evaluation in which the position and the cause of the film crack or peeling-off while a substrate is coated with a thin film would be precisely determined. Hence, the present invention not only has a novelty and a progressive nature, but also has an industry utility.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A method for evaluating a whole field stress in a thin film, comprising:
   (a) preparing a substrate;
   (b) measuring a wavefront for said substrate with a laser having a wavelength of $\lambda$ so as to obtain a first wavefront phase;
   (c) depositing an optical thin film on said substrate as a specimen;
   (d) measuring a wavefront for said specimen so as to obtain a second wavefront phase;

(e) determining a phase difference between said first wavefront phase and said second wavefront phase by means of an image subtraction;
(f) fitting said phase difference with Zernike polynomials so as to obtain a fitting result for a respective surface topography of said substrate and said specimen;
(g) retaining a coefficient of a specific term of said Zernike polynomials according to said fitting result, wherein said specific term is corresponding to a strain for said whole field stress; and
(h) obtaining said whole field stress according to said coefficient of said specific term.

2. The method according to claim 1, wherein said substrate is a BK7 optical substrate.

3. The method according to claim 1, wherein said substrate has a flatness less than $\lambda$.

4. The method according to claim 1, wherein in said steps (b) and (d), said wavefront is measured by a Fizeau interferometer with a standard planar lens having a precision less than $\lambda/10$.

5. The method according to claim 1, wherein in said step (c), said optical thin film is deposited on said substrate by a physical coating process.

6. The method according to claim 5, wherein said physical coating process is one selected from a group consisting of an evaporation, a sputtering and a physical vapor deposition.

7. The method according to claim 1, wherein said optical thin film is made of silica oxide.

8. The method according to claim 1, wherein in said step (g), said specific term is determined by a formula of $\nabla^4 Z(\rho, \theta)=0$, wherein $Z(\rho,\theta)$ represents said Zernike polynomials.

9. A method for evaluating a whole field stress in a thin film, comprising:

(a) preparing a substrate;
(b) measuring a wavefront for said substrate with a laser having a wavelength of $\lambda$ so as to obtain a first wavefront phase;
(c) depositing an optical thin film on said substrate as a specimen;
(d) measuring a wavefront for said specimen so as to obtain a second wavefront phase;
(e) fitting said first wavefront phase and said second wavefront phase with a Zernike polynomial respectively;
(f) determining said phase difference by means of numerical subtraction of the coefficients so as to obtain a result for a respective surface topography change of said substrate and said specimen;
(g) retaining a coefficient of a specific term of said Zernike polynomials according to said fitting result, wherein said specific term is corresponding to a strain for said whole field stress; and
(h) obtaining said whole field stress according to said coefficient of said specific term.

10. The method according to claim 9, wherein said substrate is a BK7 optical substrate.

11. The method according to claim 9, wherein in said steps (b) and (d), said wavefront is measured by means of two-beam interference.

12. The method according to claim 9, wherein said optical thin film is made of silica oxide.

13. The method according to claim 9, wherein in said step (g), said special terms are determined by a formula of $\nabla^4 Z(\rho, \theta)$, wherein $Z(\rho,\theta)$ represents said Zernike polynomials.

* * * * *

UNITED STATES PATENT AND TRADEMARK OFFICE
Certificate

Patent No. 7,403,270 B2 　　　　　　　　　　　　　　　　　　　　　　　　Patented: July 22, 2008

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Chi Hung Huang, Hsin-Chu (TW); Hsien-I You, Hsin-Chu (TW); Mao-Yuan Shih, Hsin-Chu (TW); Chien-Jen Chen, Hsin-Chu (TW); and Wei-Chung Wang, Hsin-Chu (TW).

Signed and Sealed this Twenty-sixth Day of February 2013.

GREGORY J. TOATLEY, JR.
*Supervisory Patent Examiner*
Art Unit 2877
Technology Center 2800